No. 632,399. Patented Sept. 5, 1899.
B. E. CHOLLAR.
GAS PURIFIER.
(Application filed Mar. 25, 1899.)
(No Model.)
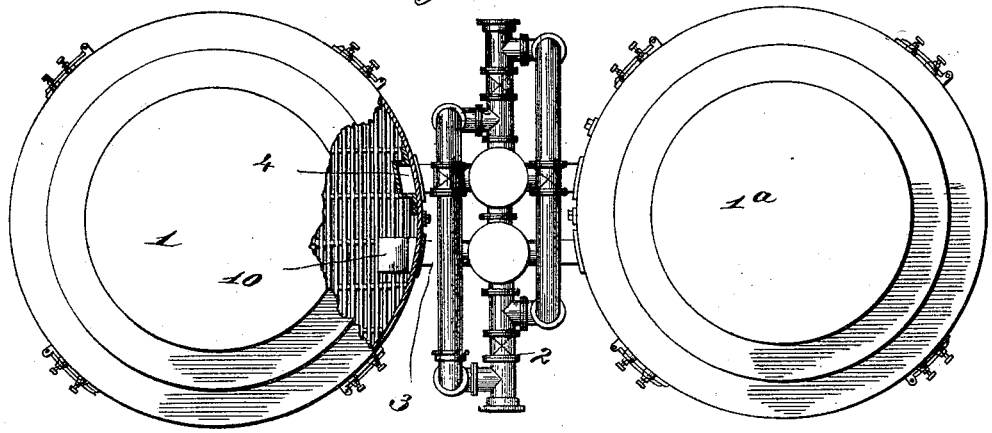
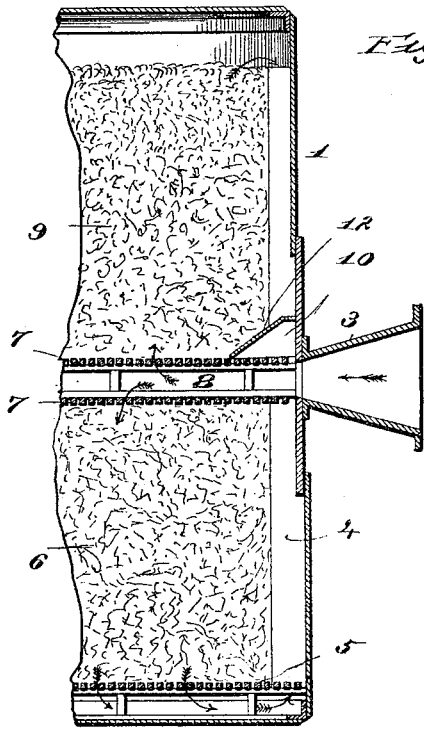
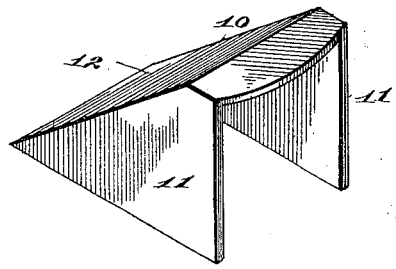
Witnesses
Inventor
Byron E. Chollar
By Wright & Ford
Attorneys

UNITED STATES PATENT OFFICE.

BYRON E. CHOLLAR, OF ST. LOUIS, MISSOURI.

GAS-PURIFIER.

SPECIFICATION forming part of Letters Patent No. 632,399, dated September 5, 1899.

Application filed March 25, 1899. Serial No. 710,445. (No model.)

*To all whom it may concern:*

Be it known that I, BYRON E. CHOLLAR, a citizen of the United States, residing at the city of St. Louis, in the State of Missouri, have invented certain new and useful Improvements in Gas-Purifiers, of which the following is a full, clear, and exact description, reference being had to the accompanying drawings, forming part of this specification.

My present invention relates to a gas-purifier of the type set forth in application for patent filed by me August 5, 1898, under Serial No. 687,773, the object of the present improvement being to supply boxes at the inlet or outlet openings of the purifier-tanks, above said openings, so that in the event of the purifying material settling within the tank the said box will afford opportunity for ingress or egress of the gas to or from the passage-way between the layers of purifying material instead of the inlet or outlet opening becoming closed by the purifying material settling thereto.

My invention consists in the application of the said box as stated and its form of construction, as will hereinafter be fully described, and pointed out in the claim.

Figure I is a top view of a pair of purifier-tanks connected by reverse piping, one of said tanks being shown partly broken away in horizontal section to show the interior construction. Fig. II is an enlarged vertical sectional view of one of the tanks, taken on a line through the gas inlet or outlet. Fig. III is a perspective view of the box constituting my improvement.

The purifying-tanks 1 and 1ª and the reverse piping 2 that connects them are all substantially the same in construction as those shown and described in my application for patent hereinbefore referred to. As stated in said application, the piping 2 is connected to both of said tanks in such manner that the flow of gas therethrough may be caused to travel to either tank first and from the first-entered tank to an outlet and into said piping again and to the other tank, through which it passes and returns to the piping and is conveyed thence to the point of delivery for the purified gas. It is therefore evident that, as stated in the specification of the application referred to, the inlets or outlets of the said tanks may either of them be used as an outlet or an inlet. For the purpose of convenience in description I will, however, refer to one of the openings as an "inlet" and the other as an "outlet," and in Fig. II, 3 designates the inlet, while 4 designates an outlet tube, both said inlet and outlet tubes being provided with communication to the piping 2.

5 designates the lower layer of gridwork, on which the lower layer 6 of purifying material is supported.

7 designates the double gridwork, having a gas passage-way 8 therein, and 9 is the upper layer of purifying material, mounted on the double gridwork 7.

The layers of purifying material 6 and 9 being wholly supported by the gridwork, as provided for in the application for patent referred to, it is evident that the said layers of purifying material and double gridwork interposed between them are susceptible to settling in the purifier-tank, in which event the gas passage-way 8 within the double gridwork 7 would be removed from the pipe-communicating opening 3, and therefore the free flow of gas into or out of the purifier through said opening might be interfered with. To overcome this difficulty, I have provided a box 10, adapted to fit loosely against the tank-wall and mounted on the double gridwork immediately above the opening 3. This box is shown in detail in Fig. III and is composed of side walls 11 and a tapering wall 12, and is open at its point of contact with the tank-wall and at its bottom. With the use of this box the purifying material is upheld away from the opening 3, and as the purifying material settles the said box descends into registration with the opening 3, and receives the flow of the gas in its passage into the purifier or therefrom, according to the direction of its flow, and thereby avoids any clogging of the opening 3.

I claim as my invention—

In a gas-purifier, the combination of a tank, a lower gridwork located therein, a lower layer of purifying material mounted on said gridwork, a double gridwork on said lower layer of purifying material, provided with a gas passage-way extending laterally therethrough, said tank being provided with an inlet or outlet located in proximity to the passage-way in said double gridwork, an upper layer of purifying material mounted on said double gridwork and wholly supported thereby, and a box having an open side and open at its bottom, mounted on said double gridwork in proximity to said inlet or outlet, adapted to register with said inlet or outlet on the settling of the said layers of purifying material and the double gridwork interposed between them.

BYRON E. CHOLLAR.

In presence of—
  E. S. KNIGHT,
  G. A. TAUBERSCHMIDT.